March 11, 1924.
C. M. ALLISON
PERMUTATION LOCK FOR STEERING COLUMNS
Filed Jan. 15, 1923
1,486,273
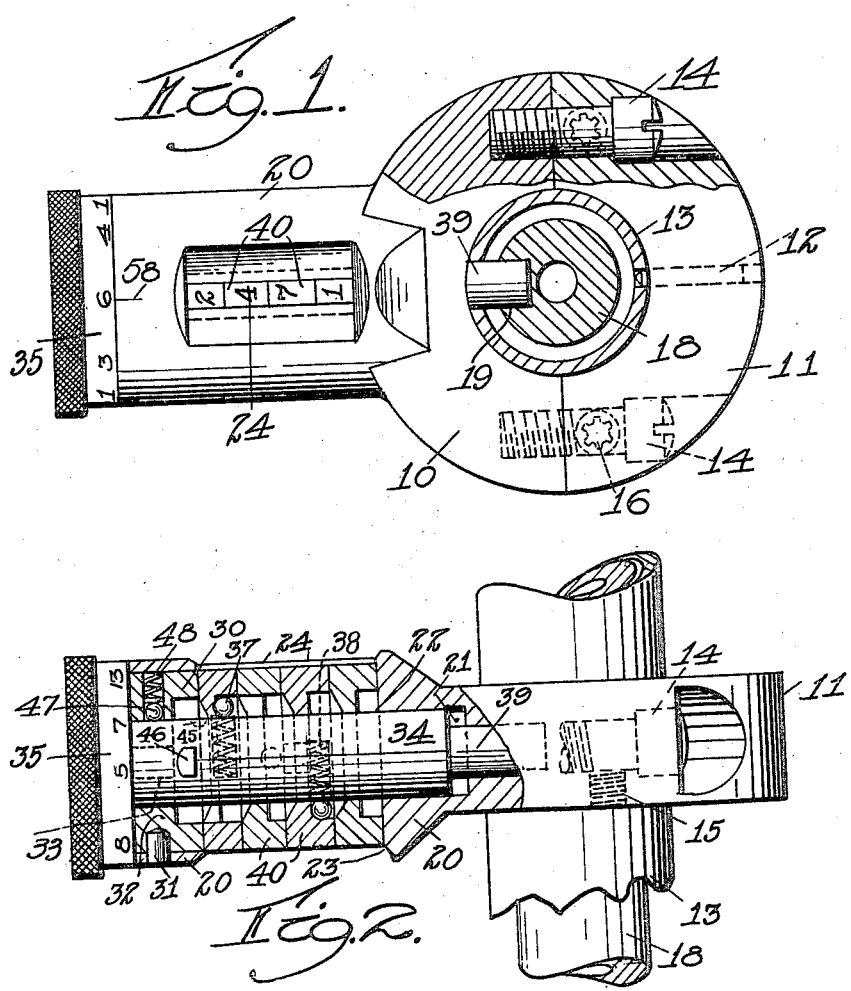
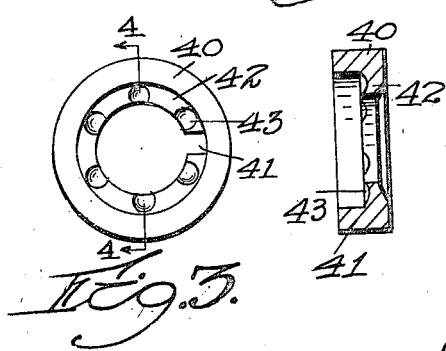
Inventor:
Charles M. Allison
By Southgate
Attorneys Patented Mar. 11, 1924.

1,486,273

UNITED STATES PATENT OFFICE.

CHARLES M. ALLISON, OF WORCESTER, MASSACHUSETTS.

PERMUTATION LOCK FOR STEERING COLUMNS.

Application filed January 15, 1923. Serial No. 612,603.

*To all whom it may concern:*

Be it known that I, CHARLES M. ALLISON, a citizen of the United States, residing at Worcester, in the county of Worcester and State of Massachusetts, have invented a new and useful Permutation Lock for Steering Columns, of which the following is a specification.

This invention relates to a combination lock for the steering column of an automobile. It is to be understood, however, that although shown as applied to that particular purpose, the lock can be used for any other analogous purpose.

The principal object of the invention is to provide a simple and inexpensive combination lock suitable for being attached to a steering column to lock the same against rotation, or for analogous purposes.

Reference is to be had to the accompanying drawings in which—

Fig. 1 is a plan of a lock constructed in accordance with this invention and shown as applied to a steering column illustrated in transverse section;

Fig. 2 is a central longitudinal sectional view of the lock showing a side view of the means for mounting it on the column;

Fig. 3 is a plan of one of the locking rings; and

Fig. 4 is an edge view of the same.

I have shown the lock as applied to the stationary column 13 by means of a ring or yoke consisting of two semi-circular sections 10 and 11. The section 11 is provided with a screw 12 having a point projecting in through it and into the stationary hollow column 13 for securing it thereto. One of the two sections is provided with two bolts 14 on opposite sides adapted to be screwed into the other section, and with a couple of blind screws 15 adapted to screw down on these bolts and hold them so that they cannot be turned. These blind screws are provided with non-circular depressions 16 in the exposed end for receiving a wrench, not shown, so that they can be turned up tight against the bolts 14. Then they are peened over so as to prevent their being removed by any ordinary means. This secures the two sections of this frame together on the stationary column 13.

The section 10 is provided with a hollow cylinder 20 extending therefrom radially. Through this is a radial opening 21 extending all the way through to a hole in the column, and the rotary steering shaft 18 is provided with a slot 19 in alignment with this opening 21 when the shaft is turned to set the wheels straight ahead. The cylinder 20 is provided with a shoulder 22 near its inner end and with a long slot 23 in one side and a narrow opening 24 arranged opposite the slot.

At the open end of this cylinder is fixed therein a collar 30 by means of a stud or the like 31. This collar is provided with a circular wall 32 inside having a passage 33 extending radially through it and with a circular central passage which constitutes a bearing for a locking bolt 34. This locking bolt 34 is provided with a knurled head 35 on which is a series of numbers or other characters, these parts being adapted to rotate with the bolt and preferably constituting a part thereof. Also this bolt is provided with a number of staggered radially movable locking balls 37 forced into locking position by springs 38.

On this bolt are rotatably and slidably arranged a plurality of combination locking rings 40. Each has a circumference provided with spaces in which are a set of numerals or other characters spaced equally apart. These numerals are arranged to appear in the opening 24 and these rings are adapted to be operated by turning them through the slot 23. Each one is constructed similarly to the collar 30 but not exactly the same shape. Each one has a circular passage therethrough of the size of the bolt constituting a bearing for the ring and also has a radial longitudinal passage 41 for one of the balls 37. This passage 41 is located in a wall 42 similar to the wall 32 and constituting one side of the ring. On this wall I provide a series of blind notches 43 that extend only part way through to catch on the balls 37 and deceive any one trying to pick the lock. The opposite surface of the wall 32 is beveled.

The rings are all placed loosely on the bolt and of course it will be obvious that, on account of the radial projection or balls 37 being staggered, the rings can be turned to such different positions that each of the passages therein will be in alignment with the corresponding ball. Also the collar 30 can be so located that its passage is in alignment with the first ball or in the preferred form shown, a stationary pin 46 forming a radial projection. When this occurs the knurled head can be drawn out a short distance, limited by the next ball 37 engaging the collar so as to remove the bolt 39 thereon from the slot 19 in the steering shaft. This constitutes the unlocking of the lock and permits the steering shaft to be freed so that it can be operated in the ordinary way. In order that this may be done, of course, each one of these rings has a number which appears in the corresponding opening 24 at the time when it is free to move longitudinally with respect to the bolt and that series of numbers has to appear at that point in order that the car may be unlocked. In other words, the bolt can slide backwardly a short distance when the proper combination is shown through the opening 24, and the proper number on the knurled head registers with the zero mark 58 on the cylinder 20. When the bolt is drawn back to unlocking position a ball 47 is pressed by its spring 48 into a shallow concave depression 45 in the surface of the bolt. This prevents the bolt being accidentally jarred or moved into locking position.

From what has been said it will be seen that the lock can be made in a convenient size so that it cannot be materially injured by any ordinary tampering and that the locking bolt is large enough to securely lock the steering shaft against rotation. Also that the parts are comparatively simple and inexpensive and that it is of an advantageous construction because the rings are all made just alike but the numbers are put on differently for each lock preferably or at least the rings are arranged in different relations to each other on the bolt. Also not only do the rings have to be brought to the right position, but the knurled head does also, which is another safety feature. The blind notches also tend to confuse anyone trying to pick the lock, and it is a difficult matter for anyone to tell whether the rings are in their locking position or not without knowing the combination. The party operating the lock has access to the rings at only one point, namely, the slot 23, which is longitudinal and narrow, and it is practically impossible for him to know whether any of the rings are in the right position or not. The means for holding the lock on the steering column is solid and substantial, and on account of the way it is attached, it is practically impossible to detach it without the use of shop tools and methods.

I do not claim herein the means for attaching the lock to the steering column, as that is the subject matter of my prior application Serial No. 588,272, filed Sept. 14, 1922.

Although I have illustrated and described only a single form of the invention I am aware of the fact that modifications can be made therein by any person skilled in the art without departing from the scope of the invention as expressed in the claims.

Therefore I do not wish to be limited to all the details of construction herein shown and described, but what I do claim is:—

1. In a lock, the combination of a cylinder, a bolt extending through said cylinder and adapted to be projected therefrom to lock it, a collar in which said bolt is rotatably mounted and having a wall surrounding it, said wall being provided with a passage therethrough, the bolt having a series of staggered projections, one of which is adapted to enter said passage when the head is turned to a definite position to permit the bolt to be withdrawn, and a series of rings in said cylinder rotatably mounted on the bolt, each having a passage therethrough for one of the projections on the bolt.

2. In a lock, the combination of a cylinder, a bolt extending through said cylinder and adapted to be projected therefrom, said bolt having a series of radial balls thereon in staggered relationship, a collar in which said bolt is rotatably mounted and having a wall surrounding it, said wall being provided with a passage therethrough, a projection on the bolt adapted to enter said passage when the head is turned to a definite position to permit the bolt to be withdrawn, and a series of rings rotatably mounted on the bolt, each having a passage therethrough for one of the balls on the bolt, said rings being located in the cylinder and prevented from moving endwise in it, whereby each ring prevents the movement of the bolt unless the respective ball is in its passage, the cylinder having an opening on one side through which the characters on said rings can be observed, and a slot on the other side through which the rings can be turned by hand.

3. In a lock, the combination of a cylinder, a bolt extending through said cylinder and adapted to be projected therefrom, said bolt having a series of radial balls thereon in staggered relationship, and a series of rings rotatably mounted on the bolt, each having a passage therethrough for one of the balls on the bolt, said rings being located in the cylinder and prevented from moving endwise in it, whereby each ring prevents the movement of the bolt unless the respective ball is in its passage, the cylinder having an opening on one side through which the characters on said rings can be observed, and a slot on the other side through which the rings can be turned by hand.

4. In a lock, the combination with a hollow cylinder or casing, of a series of rings rotatably mounted thereon, each having a wall provided with a central cylindrical passage, said wall also having a longitudinal passage communicating with the cylindrical passage and a locking bolt located in said casing passing through said rings, and having a series of staggered spring pressed balls adapted to be projected by their springs beyond its surface, each into one of said rings, whereby when the rings are so placed on the bolt that their longitudinal passages register with the several balls, the bolt can be withdrawn, a collar on the bolt in the casing, and a spring pressed ball in said collar bearing on the bolt for preventing the accidental locking of the bolt, said bolt having a shallow notch in position for receiving the last named ball when the bolt is withdrawn to unlocking position.

In testimony whereof I have hereunto affixed my signature.

CHARLES M. ALLISON.